Feb. 9, 1926.

A. H. WOODWARD 1,571,988

SERVICE CABINET

Filed July 2, 1923    5 Sheets-Sheet 1

Witnesses:
W. F. Kilroy
Harry R. White

Inventor:
Arthur H. Woodward
By Brown, Boettcher & Dienner
Attys.

Feb. 9, 1926.
A. H. WOODWARD
SERVICE CABINET
Filed July 2, 1923
1,571,988
5 Sheets-Sheet 2
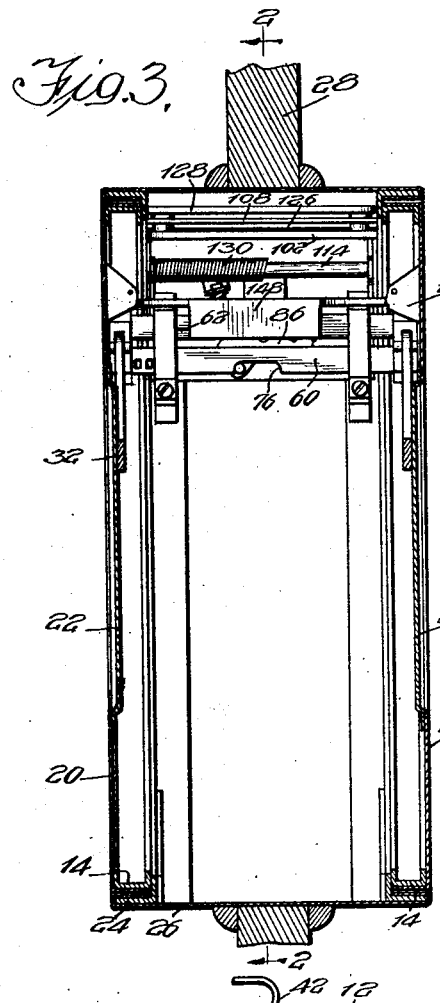
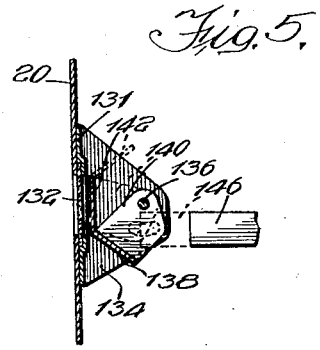
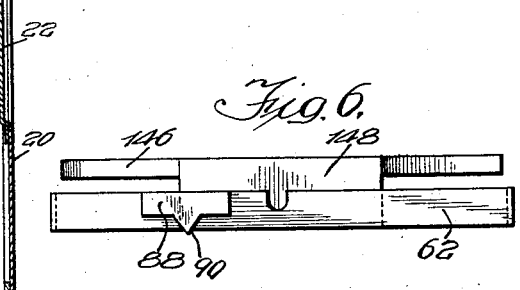
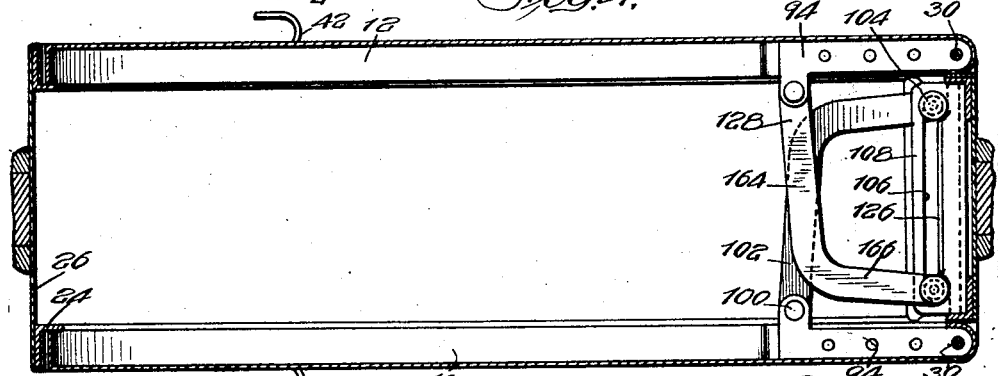

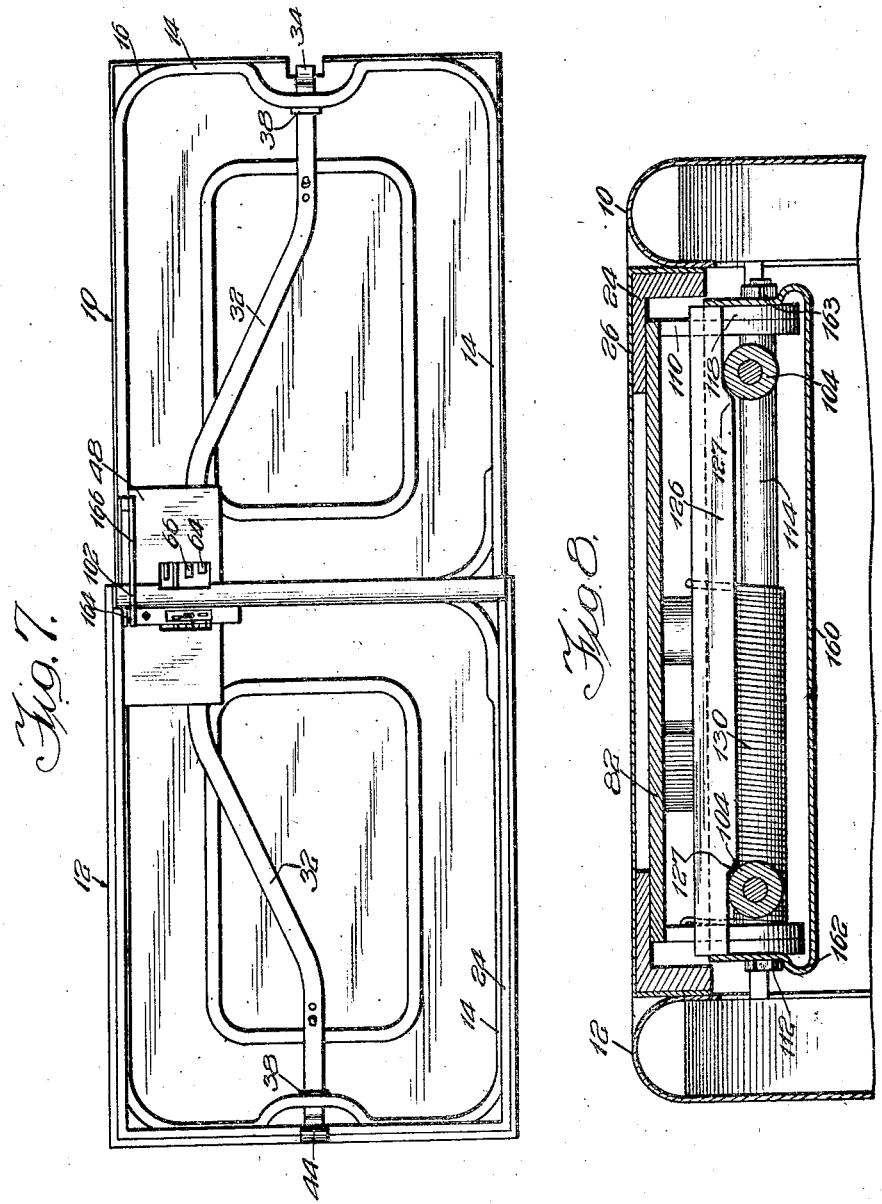

Feb. 9, 1926.
A. H. WOODWARD
1,571,988
SERVICE CABINET
Filed July 2, 1923     5 Sheets-Sheet 4
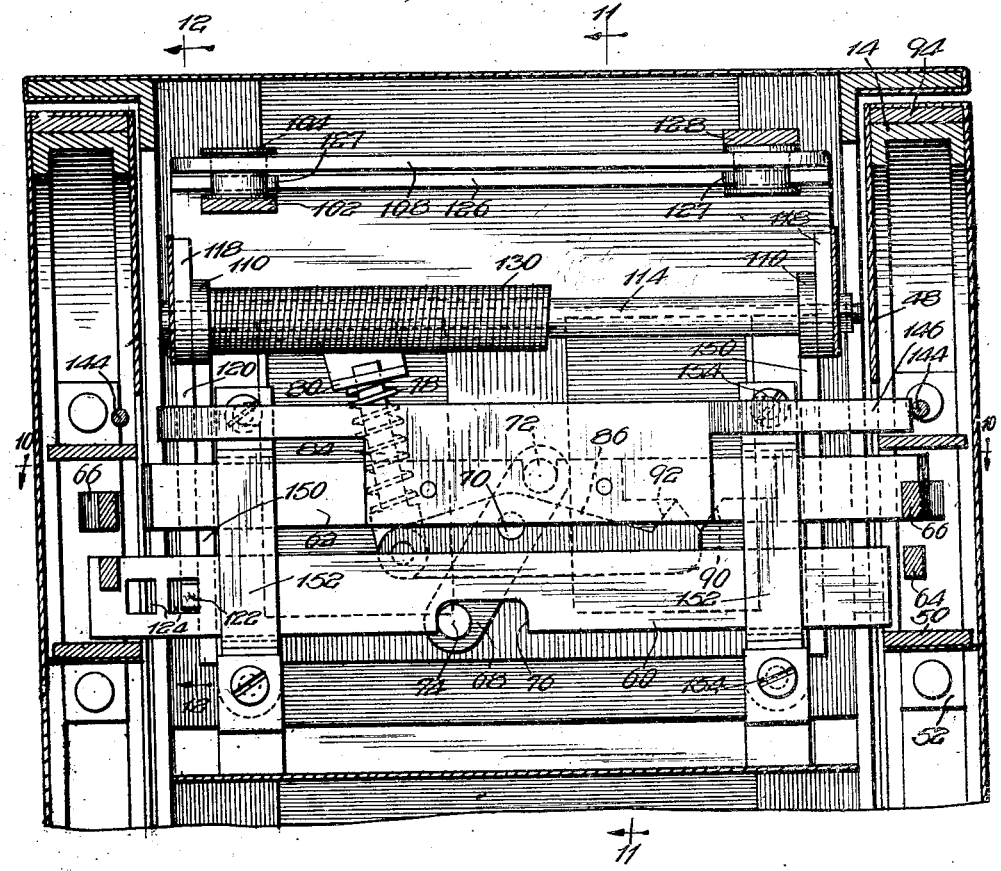

Feb. 9, 1926.

A. H. WOODWARD 1,571,988

SERVICE CABINET

Filed July 2, 1923 5 Sheets-Sheet 5

Witnesses:
W. F. Kilroy
Harry B. L. White

Inventor:
Arthur H Woodward
By Brown, Boettcher & Dienner
Attys.

Patented Feb. 9, 1926.

1,571,988

UNITED STATES PATENT OFFICE.

ARTHUR H. WOODWARD, OF CHICAGO, ILLINOIS, ASSIGNOR TO INTERNATIONAL REGISTER CO., OF CHICAGO, ILLINOIS, A CORPORATION OF ILLINOIS.

SERVICE CABINET.

Application filed July 2, 1923. Serial No. 648,886.

*To all whom it may concern:*

Be it known that I, ARTHUR H. WOODWARD, a citizen of the United States, residing at Chicago, in the county of Cook and State of Illinois, have invented a certain new and useful Improvement in Service Cabinets, of which the following is a full, clear, concise, and exact description, reference being had to the accompanying drawings, forming a part of this specification.

My invention relates to service cabinets, of the general type disclosed in United States patent to Matchette No. 1,222,965, April 17, 1917, whether such cabinets be mounted in a door, or in a stationary wall forming part of an enclosure.

One object of the invention is to eliminate the possibility of pilfering or accidental or intentional faulty operation of such a cabinet.

Another object is to completely eliminate the additional risk of theft or breaking in, involved in the installation and use of service cabinets. Stated in another way, this object is to reduce the easiest means of securing access to a house, apartment or other analogous enclosure to access through some other opening than the service cabinet.

Another object is to provide a simple and effective interlock for service cabinets.

Another object is to put the interlocking mechanism near the hinges of the doors of the cabinet.

Another object is to diminish the number of springs required.

Another object is to provide simplified signals and operating means therefor.

Another object is to provide an improved linkage for limiting the opening movement of a door.

Further objects and advantages of the invention will become apparent as the description proceeds.

In the accompanying drawings:

Fig. 3 is a section on line 3—3 of Fig. 1;

Fig. 4 is a horizontal section on line 4—4 of Fig. 1;

Fig. 5 is a detail section of the signaling means;

Fig. 6 is a side elevation of the shift slide;

Fig. 7 is a side elevation of the entire cabinet with one door thrown wide open;

Fig. 8 is a horizontal section of the locking mechanism on line 8—8 of Fig. 11;

Fig. 9 is a detailed section on line 9—9 of Fig. 2, showing most of the interlock in elevation;

Fig. 10 is a horizontal section on line 10—10 of Fig. 9;

Figure 11:
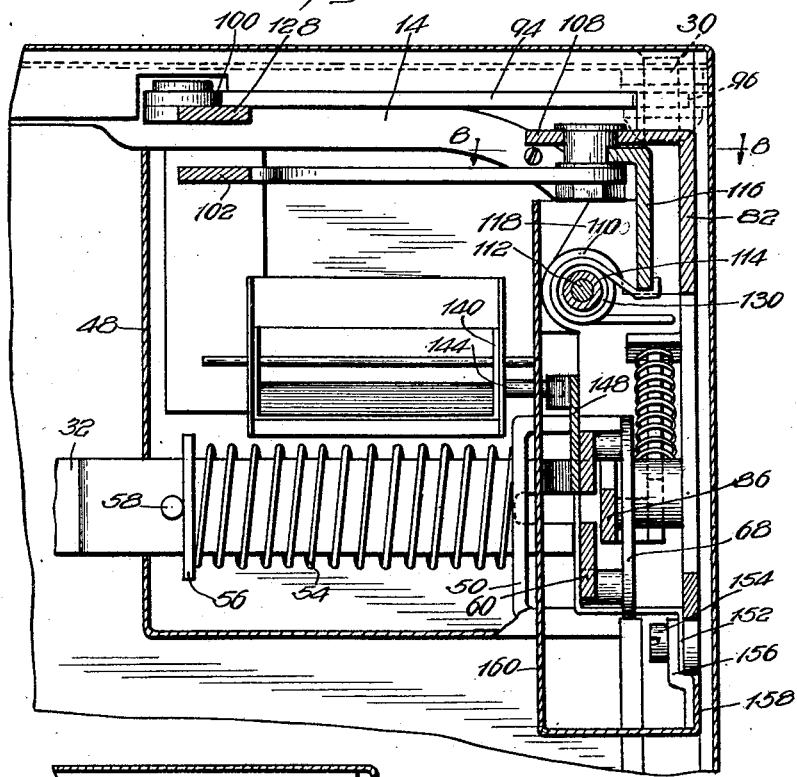
Figure 12:
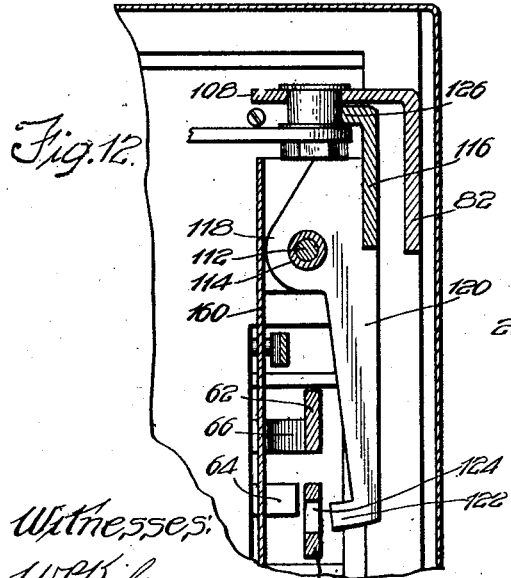

Figs. 11 and 12 are vertical sections on lines 11—11 and 12—12 of Fig. 9; and

Figure 1:
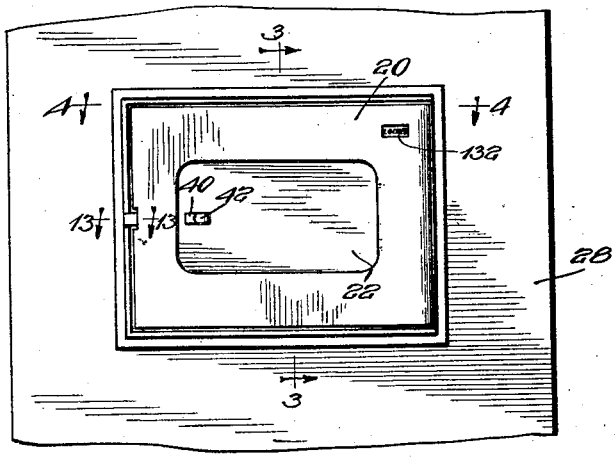
Fig. 1 is a front elevation of a service cabinet according to my invention, with the doors closed.
Figure 2:
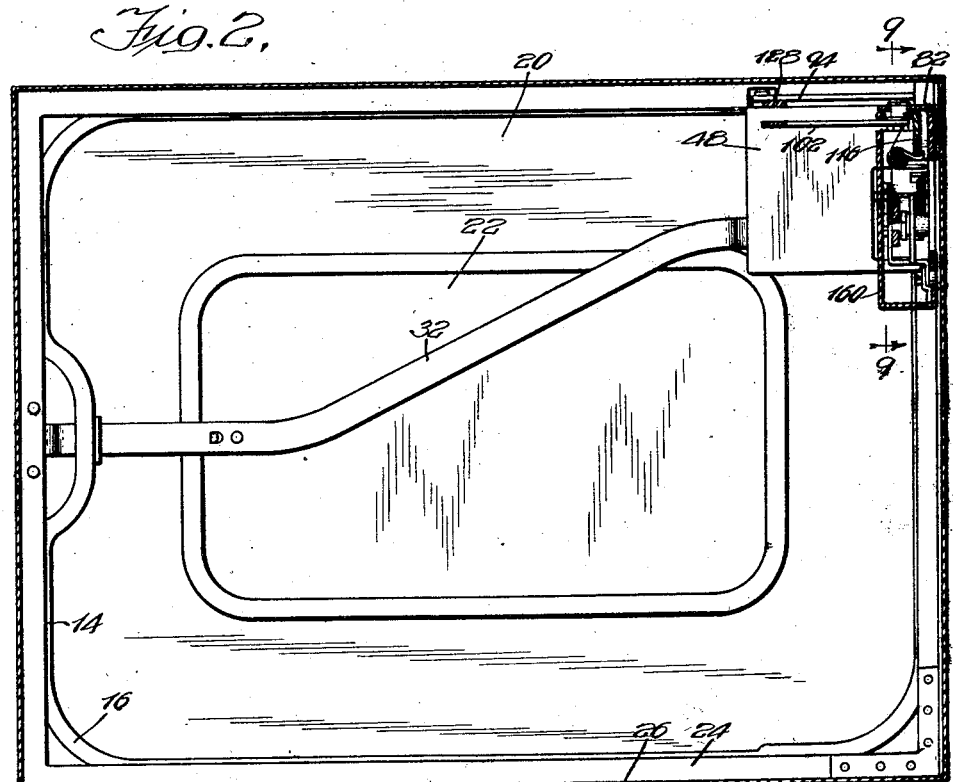
Fig. 2 is a central section on line 2—2 of Fig. 3.
Figure 13:
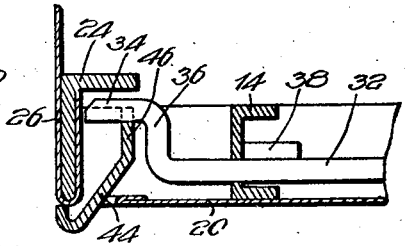

Fig. 13 is a detailed horizontal section on line 13—13 of Fig. 1.

In the embodiment of my invention selected for illustration, the cabinet itself is formed entirely of material not affected by moisture, such as metal, bakelite, or waterproof fibre. This is important because such cabinets are frequently exposed to the weather on one side only, and this exposure, especially in combination with the wide temperature differences frequently obtaining between opposite sides of the cabinet, makes the best of woodwork construction quite unreliable and unsatisfactory.

*Metal cabinet.*

Lightness is, of course, always essential in any type of construction, and I therefore provide in the metallic construction, a complete skeleton framework of structural shapes, and a sheathing or covering of sheet metal thick enough not to dent easily, which covering incidentally reinforces the skeleton framework, and materially contributes to the structural strength of the cabinet as a whole. Although, standing alone, the I or H section is the most efficient, when a combination of plates and structural shapes is relied upon for rigidity and strength, the channel section is most efficient, and even an angle section is better than an I section. Accordingly, the outer door 10 and inner door 12 of my improved cabinet are each built up of a channel iron frame 14 extending around the periphery of the door and preferably curved adjacent the corners at 16, to form a substantially square frame receiving the sheathing 20. This sheathing is further stiffened by providing inset panels 22 in the center of each door.

The remaining walls of the cabinet are built up of angle iron 24 and sheathing 26. Except at the door hinges the leg of the angle perpendicular to the plane of the closed door projects outward, so that a shelf or recess is formed within which the door can nest. Any suitable wall structure 28, either stationary or forming a portion of a door, engages and supports the cabinet in any suitable way.

The pintles 30 for doors 10 and 12 are preferably placed at the same side of the cabinet, and each door carries adjacent its pintle, connections for operating the interlocking mechanism and for positively insuring complete and correct functioning thereof at all times. For this purpose latch bars 32 extend diagonally across each door, terminating at their outer ends (see Fig. 13) in latches 34 offset from the plane of the rest of the bar by an offset 36. The bar slides through a slot in channel 14, and carries a lug 38 to contact the web of channel 14 and limit the latching movement. A hook 42, or other suitable projection extends outwardly from the latch bar through a slot 40 in panel 22 for manual operation of the latch bar to open the door. As the latch bar and panel lie in contact with each other (see Fig. 3) the latch bar at all times closes that portion of slot 40 not occupied by hook 42. Retainer 44 (see Fig. 13) comprises an inclined portion, terminating in a level portion of appreciable length. This causes the latch bar to be forced back, and then held back for a definite distance of movement before it snaps into the position shown in Fig. 13.

Referring now to Figs. 9, 10, and 11, each latch bar 32 enters a casing 48 and is slidably received in a suitable slot in the bight of a U-shaped supporting plate 50 bolted on channel 14 as at 52, (see Fig. 10). A compression spring 54, bearing against bracket 50 and a plate 56 held by pin 58, normally resiliently urges the latch bar into latching position.

*Interlock.*

The primary function of interconnecting the two latch bars so that only one of them can be withdrawn at a time, is performed by a bolt 60, slidable to and fro to selectively obstruct the movement of the latch bar; and the secondary function of shifting this bolt each time a door is closed to lock said door closed and permit subsequent opening of the other door only, is performed primarily by a shifter 62 slidable to and fro parallel to bolt 60. The rear, or hinge, end of each latch bar is bifurcated to form a blocking point 64 on the same level as bolt 60, and a shifting cam 66 on the same level as shifter 62.

A lost motion connection between shifter 62 and bolt 60 is provided, comprising lever 68 pivoted at 70 on a stationary pintle, and carrying pin 72 entering a suitable slot in shifter 62. At its lower end a similar pin 74 enters a notch 76 in bolt 60, which notch is elongated as clearly shown in Fig. 9 to provide a lost motion connection between the shifter and bolt. Biasing means for the shifter is provided comprising a compression spring 78 bearing against a lug 80 bent out of the main supporting plate 82, to urge plunger 84 down and rock ratchet lever 86 about pintle 70. Economy in construction is attained by pivoting levers 68 and 86 both on the same pintle, and designing the parts so that proper operation can be obtained with such mounting. Shifter 62 carries a block 88 lying in the plane of lever 86 and provided with a triangular point 90 adapted to ride over a similar point 92 on the end of the lever.

With the parts in the positions shown in Figs. 9 and 10, door 10 can be opened but door 12 is locked by the projecting end of bolt 60. Means are provided for postponing the shifting of bolt 60 to permit the next opening of door 12 until after door 10 has been opened, closed, and its latch bar has moved past the point of locking engagement with detent 46 and is itself locked against withdrawal from said detent. The same strip 94 carrying bushing 96 (see Fig. 11) for the door pintle 98, has an inwardly projecting ear 100, to which is pivoted one end of draglink 102. The other end of the draglink carries a flanged roller 104 slidable transversely across the cabinet in a slot 106 in a horizontal shelf 108 bent forward at the upper edge of the main supporting plate 82. Below plate 108 ears 110 at the end of plate 82 support a combined pintle and cover retaining bolt 112 carrying a sleeve 114. A rocking plate 116 pivoted on pintle 112 by means of ears 118 at its ends, carries at one end a depending arm 120 terminating in a locking projection 122 adapted to enter either one of two apertures 124 provided for the purpose in bolt 60. The upper edge of plate 116 is turned over just under shelf 108 to form a cam 126 projecting partly into the path of roller 104 all across the cabinet except at the extreme ends at 127.

Duplicate equipment is provided for door 12, except that the other draglink 128 is connected with its roller 104 above the level of shelf 108. A coiled spring 130 is provided, wrapped around sleeve 114 to bias plate 116 into the position shown in Fig. 12, so that whenever both doors are closed, bolt 60 will not be locked against movement.

The operation of the interlock will now be described. Beginning with the parts in the position shown in Fig. 10, withdrawal of the latch bar for door 10 to open the door will first cam the shifter 62 to the left, through a trifle more than half its range of movement, carrying the tip of point 90 a trifle past the tip of point 92, so that spring 78 now tends to complete the shifting of the parts. Further movement of the shifter is prevented by engagement of pin 74 with end of slot 76, bolt 60 itself being prevented from further movement to the right by toe 64 of the latch bar, which has moved back directly across its path. Door 10 must be moved far enough to carry latch 34 past part 46, before the latch bar can move forward again where it will no longer obstruct movement of bolt 60. Appreciably before this amount of movement has occurred, roller 104 will move down slot 106 and cam plate 116 over to move locking projection 122 into the right hand aperture 124. As soon, therefore, as door 10 is thrown open and latch bar 32 removes its toe 64 from the path of bolt 60, locking projection 122 still prevents any shifting of the bolt, carrying the relatively light load imposed by spring 78, and holding door 12 securely locked.

The person who has opened the door 10, which door is preferably but not necessarily the outer door, can now deposit or remove articles from the cabinet. After this is done door 10 is again closed. During this movement the sequence of operation will be as follows: First, latch bar 32 will be pushed back by inclined surface 44 far enough to bring toe 64 in front of bolt 60; second, roller 104 will come into register with its notch in cam 126 and locking projection 122 will be withdrawn; third and fourth, hook 34 will pass the inner edge of detent 46, the latch bar snapping into place, withdrawing toe 64 from the path of bolt 60, which bolt will immediately slip over into the path of toe 64, so that the latch bar cannot again be withdrawn; fifth, the completion of the movement of bolt 60 will carry it far enough to remove its other end from the path of the other toe 64, thereby unlocking door 12.

This fifth function, release of door 12, is the one which must without fail be rendered impossible of performance by any erroneous manipulation or defective operation of the device. During the sequence of operation the function of preventing this is performed by two different agencies, and transferred from one agency to the other and back again, but there is in every instance a definite overlapping, much larger than any possible errors in construction, adjustment or manipulation. There is no tendency to shift bolt 60 until after toe 64 has moved in front of it to obstruct its path, when the completion of the movement cams the shifter 62 past its center position. Toe 64 cannot move out of the path of bolt 60 until after roller 104 has moved locking projection 122 into place. When the door is subsequently closed, toe 64 moves into position in front of bolt 60 before roller 104 permits locking projection 122 to be withdrawn. Latch 34 has to enter behind detent 46 before toe 64 is moved clear of the path of bolt 60; and, finally, bolt 60 will move into the path of toe 64 before its other end will move clear of the corresponding toe on the other latch bar.

Signalling means.

Inside each casing 48 and mounted on sheathing 20, (see Fig. 5) is a plate 131 provided with a central aperture with offset edges to receive a transparent cover 132, and end lugs 134 for supporting a pintle 136. A smaller plate 138, is pivoted for free swinging movement on pintle 136 by means of ears 140 and carries a lateral projection 142 forming with plate 138, two sides of a regular polygon centered about pintle 136. A pin 144 projects from one of the ears 140 through a suitable slot in lug 134 into the path of a projecting arm 146 on a single operating plate 148 carried by shifter 62. Upon reference to Fig. 5 it will be noted that arm 146 makes contact with pin 144 during somewhat less than half its total movement, the contact movement corresponding with the movement of shifter 62 accompanying the final shifting of bolt 60 from one position into the other. The signal on the inner door will not, therefore, be affected by opening of the outer door, although the signal on the outer door will be released to fall under the force of gravity from the dotted line position of Fig. 5 to the full line position and change the indication. When door 10 is finally closed and locked, the signal in the inner door will be changed to apprise persons on the inside of that fact.

Each signal, of course, carries suitable indicia in the usual way for indicating the locked or unlocked condition of its door. Furthermore, each name plate 138 will indicate the unlocked condition of the door, and each lateral projection 142 the locked position, so that the indicating plates themselves are complete duplicates.

Safety.

Bolt 60 and shifter 62 are guided in sliding movement by contact on one set of faces with the edges of wings 150 bent forward from the side of the main supporting plate 82; and on the other side by U-shaped strips 152 held in place by the same screws 154 employed to fasten plate 82 in place. The two lower screws 154 also fasten ears 156 defining a slot for receiving the upturned edge 158 of the interlock casing 160. This casing is slipped up into place and, as shown in Fig. 8, fastened there by bolt 112. It is preferably bent out to form small ridges 162 lying close to the head of bolt 112 and to retaining nut 163 to prevent said bolt and nut from turning. It will be evident, that upon opening door 10, a thief or would-be pilferer, will have free access to nut 163, but that after removing the same, he could accomplish nothing further, as bolt 112 would strike against door 12 to prevent its removal. His main achievement, therefore, would be to apprise the next person inspecting the mechanism that it had been tampered with, without in any way interfering with its subsequent operation.

The operation hereinabove described should also be borne in mind. It will be apparent that there is no time factor in any step, and that where continuity of function is essential the steps overlap, each step beginning before the preceding step ends; whereas where discontinuity is essential, the two steps required to be discontinuous, are arranged so that the second step does not begin until after the first step has gone so far that it cannot be stopped. Thus, on opening, projection 122 comes into action before toe 64 is rendered inoperative, and on closing toe 64 becomes operative before projection 122 is withdrawn. Similarly the final shifting movement of bolt 60 cannot begin until after detent 46 is effectively engaged, and cannot continue without locking the outer door 10 before releasing the inner door 12.

Door check.

Draglinks 102 and 128 perform an important function in addition to controlling the interlock. Referring to Figs. 4, 7 and 11, it will be seen that each link comprises two portions bent to an angle only slightly less than 90 degrees, instead of extending straight from one pivot to the other. For purposes of discussion, link 128 will be considered as comprising a door-engaging portion 164 and a wall-engaging portion 166. The opening movement of door 12 will rotate the entire link in a clockwise direction and bring portion 164 into parallelism with strap 94 and door 12, and portion 166 into parallelism with the side wall of the cabinet. The elbow joining the two portions will be moved in a path going substantially to pintle 30, so that when the respective portions do make contact with the door and wall respectively, the link limits further opening movement of the door. This limitation is imposed by engagement at two points remote from the pintle on opposite sides, and at one or two points close to the pintle, so that heavy loads can be resisted, without overstraining the parts. It will be apparent that by changing the angularity of the two portions, any desired angle of opening can be permitted door 12, without relying on any external check to stop its movement. Thus if the cabinet is to be installed in a corner where door 12 can only be opened 90 degrees, link 128 should be approximately straight, to limit the opening movement of the door, without letting it hit the wall. To adapt the individual cabinet for mounting in all sorts of positions, it is only necessary to carry a few extra draglinks of different angularity in stock, all the rest of the mechanism remaining entirely unchanged.

An additional advantage of this type of construction, is that the member limiting the opening movement of the door lies out of the way close to the door and side wall of the cabinet when the door is open, instead of extending diagonally across the angle between them, as the ordinary tension brace does. Furthermore, there is no limit to the angle of opening at which the door can be successfully braced, as the door can readily be designed to swing open through considerably more than 180 degrees. A tension brace cannot operate with door openings not substantially less than 180 degrees.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:—

1. In combination, a compartment, a plurality of doors for permitting access to the interior of said compartment, locking means for each of said doors, detent means for engaging each of said locking means, said detent means being located adjacent the door hinges and engaging one of said locking means at all times, and actuating means for causing said detent means to engage a different one of said locking means at each actuation.

2. In combination, a compartment having a plurality of openings permitting access to the interior thereof, doors for closing said openings, locking means for each of said doors, detent means adjacent the door hinges for engaging said locking means one at a time to prevent the opening of the corresponding door, said detent means always retaining one of said doors closed, and signal means for each one of said doors, said signal means operated by said detent means to indicate which of the doors may be unlocked.

3. In combination, a cabinet, a door for said cabinet, a latch bar for said door, a bolt adjacent the door hinge engaging said latch bar to prevent the unlocking of said bar, a second door, a latch bar for said second door, said latter latch bar controlling the disengagement of said bolt and said first latch bar, and spring means to prevent accidental dislodgment of said bolt.

4. In combination, a compartment, a door for permitting access to said compartment, a latch and latch bar for said door, detent means remote from said latch operated by movement of said latch bar to the locking position for engaging said latch bar and preventing withdrawal thereof, a signal operated by said detent means, a second door, a latch and latch bar for said second door, said second latch bar causing disengagement of said detent means from said first latch bar.

5. In combination, two doors, latch and retainer means for each door, a locking obstacle movable to selectively obstruct withdrawal of said latches at points remote from said retainer, and connections operated by each latch for locking said latch and unlocking the other latch.

6. In combination, two doors, a latch and retainer means for each door, a locking obstacle movable to selectively obstruct withdrawal of said latches, and connections remote from said retainer operated by each latch for locking said latch and unlocking the other latch.

7. In combination, a door, latch and retainer means for said door, a locking obstacle remote from said retainer means, and connections actuated by said latch for moving said obstacle to lock said latch against further actuation.

8. In combination, a door, latch and retainer means for said door, a locking obstacle, and connections remote from said retainer means actuated by said latch for moving said obstacle to lock said latch against further actuation.

9. In combination, a door, latch and retainer means for said door, a locking obstacle, shifting means, connections for actuation of said shifting means upon withdrawal of said latch to open said door, and means for preventing said shifting means from acting until said door is closed and said latch has engaged said retainer, said shifting means when released moving said locking obstacle to lock said latch.

10. In combination, two doors, an interlock between said doors, a casing enclosing and protecting said interlock, retaining means for said casing withdrawable only when one door is open, and fastening means for said retaining means accessible only when the other door is open.

11. In combination, two doors, interlocking means for said doors, casing means enclosing and protecting said interlocking means, retaining means for said casing means withdrawable only when one door is open, and fastening means for said retaining means accessible only when the other door is open.

12. In an interlock, two doors, a latch bar for each door, a retainer for each latch bar requiring withdrawal of said bar throughout a definite predetermined displacement of said door from closed position, an interlocking element movable to selectively obstruct withdrawal of said bars, means actuated by withdrawal of the unobstructed bar tending to shift said interlocking member, and displacement sensitive means for preventing such shifting whenever said door is farther from closed position than said predetermined displacement.

13. In an interlock, two doors, a latch bar for each door, an interlocking element movable to selectively obstruct withdrawal of said latch bars, means actuated by withdrawal of the unobstructed bar tending to shift said element, and means to prevent said shifting when either door is not completely closed, said preventing means including two different displacement sensitive means operating throughout overlapping displacements.

14. In an interlock, two doors, a latch bar for each door, an interlocking element movable to selectively obstruct withdrawal of said latch bars, means actuated by withdrawal of the unobstructed bar tending to shift said element, and means to prevent said shifting when either door is not completely closed, said preventing means including two different displacement sensitive means operating throughout overlapping displacements, one of said displacement sensitive means comprising said latch bar itself.

15. In an interlock, two doors, a latch bar for each door, an interlocking element movable to selectively obstruct withdrawal of said latch bars, means actuated by withdrawal of the unobstructed bar tending to shift said element, and means to prevent said shifting when either door is not completely closed, said preventing means including two different displacement sensitive means operating throughout overlapping displacements, one of said displacement sensitive means comprising said latch bar itself and means for holding it in the path of said element throughout a predetermined door displacement.

16. In an interlock, two doors, a latch bar for each door, an interlocking element movable to selectively obstruct withdrawal of said latch bars, means actuated by withdrawal of the unobstructed bar tending to shift said element, said element being obstructed from shifting by said latch bar throughout a predetermined door displacement near closed position, and independent means for obstructing said element throughout a displacement beginning within said first displacement and including all open positions therebeyond.

17. In an interlock, two doors, a latch bar for each door, an interlocking element movable to selectively obstruct withdrawal of said latch bars, means actuated by withdrawal of the unobstructed bar tending to shift said element, said element being obstructed from shifting by said latch bar throughout a predetermined door displacement near closed position, and independent means for obstructing said element throughout a displacement beginning within said first displacement and including all open positions therebeyond, movement of said latch bar into latching position after the door has been completely closed releasing said element.

18. In an interlock, two doors, a latch bar for each door, an interlocking element movable to selectively obstruct withdrawal of said latch bars, means actuated by withdrawal of the unobstructed bar tending to shift said element, said element being obstructed from shifting by said latch bar throughout a predetermined door displacement near closed position, and independent means for obstructing said element throughout a displacement beginning within said first displacement and including all open positions therebeyond, movement of said latch bar into latching position after the door has been completely closed releasing said element, and simultaneously locking said latch bar.

19. In combination, a door, a latch bar carried by said door, a locking element, said bar and element being mounted to slide into a common space, whereby movement of one into said space locks the other out, and means actuated by sliding said bar into said space for sliding said element into said space when said bar is withdrawn.

20. In combination, a door, a latch bar carried by said door, a locking element, said bar and element being mounted to slide into a common space, whereby movement of one into said space locks the other out, means actuated by sliding said bar into said space for sliding said element into said space when said bar is withdrawn, and means for preventing sliding of said element when the door is not closed.

21. In combination, two doors, a latch bar carried by each door, a locking element, one part of said locking element and one part of one latch bar being positioned to slide into and out of the same space, whereby they mutually lock each other out of said space, and another part of said locking element and a part of the other latch bar being positioned to slide into a different space, said locking element occupying one of said spaces at all times to prevent simultaneous withdrawal of said latch bars.

22. In combination, two doors, a latch bar carried by each door, a locking element, one part of said locking element and one part of one latch bar being positioned to slide into and out of the same space, whereby they mutually lock each other out of said space, and another part of said locking element and a part of the other latch bar being positioned to slide into a different space, said locking element occupying one of said spaces at all times to prevent simultaneous withdrawal of said latch bar, and means for shifting the element upon actuation of one latch bar to lock said bar and release the other one.

23. In combination, two doors, a latch bar carried by each door, a locking element, one part of said locking element and one part of one latch bar being positioned to slide into and out of the same space, whereby they mutually lock each other out of said space, and another part of said locking element and a part of the other latch bar being positioned to slide into a different space, and means for shifting said element to prevent simultaneous opening of said doors.

24. In an interlock, an interlocking element, two latch members interlocked thereby, said element and members mutually obstructing movement of each other into two spaces remote from the latch ends of said members and common to the path of movement of said element and each of said members respectively.

25. In an interlock, in interlocking element, two latch members interlocked thereby, said element and members mutually obstructing movement of each other into two spaces remote from the latch ends of said members common to the path of movement of said element and each of said members respectively, said element occupying one of said spaces at all times.

26. In combination, two doors, an interlock preventing simultaneous opening of said doors, latches for said doors, means operated by withdrawal of said latches for operating said interlock, and means sensitive to door displacement for postponing interlock operation when either door is open.

27. In combination, a pivoted door, locking means for said door, and control means sensitive to door displacement governing the action of said locking means, said control means including a link pivoted to said door remote from the door pivot.

28. In combination, a pivoted door, locking means for said door, and control means sensitive to door displacement governing the action of said locking means, said control means including a link pivoted to said door remote from the door pivot, and cam means actuated by the other end of said link.

29. In combination, two doors, an interlocking element shiftable to selectively prevent opening said doors, a shifter, spring biased out of an intermediate position, means actuated by opening the door not locked for moving said shifter past intermediate position, a lost motion connection between said shifter and element to permit said movement, and means affected by the position of the door for preventing the final movement of said shifter and element until the door has been closed.

30. In combination, an interlock bolt, an actuating slide, a pivoted lever connecting said slide and bolt, spring biasing means for said slide including a pivoted pawl, and a single pivot for said lever and pawl.

31. In combination, two doors, latches therefor, an interlocking element associated with said latches, means actuated by opening one door tending to shift said element to lock the door last opened, an obstruction for preventing shifting of said element, and means positively holding said obstruction in operative position while the door is open.

32. In combination, two doors, latches therefor, an interlocking element associated with said latches, means actuated by opening one door tending to shift said element to lock the door last opened, an obstruction for preventing shifting of said element, means positively holding said obstruction in operative position while the door is open, and means for resiliently withdrawing said obstruction after the door has been closed.

33. In combination, a pivoted door, locking means for said door, and cam control means sensitive to door displacement for controlling the action of said locking means, said control means including a movable cam mounted independently of said door, and a cam actuating device operatively associated with said door.

34. In a service cabinet, in combination, doors, latches for said doors, and interlocking mechanism between said latches, said mechanism including a shifter actuated by said latches, a locking element, and a lost motion connection between said shifter and element.

35. In a service cabinet, in combination, doors, latches for said doors, and interlocking mechanism between said latches, said mechanism including a shifter actuated by said latches, a locking element, a lost motion connection between said element and shifter, and spring biasing means operating on said shifter.

In witness whereof, I hereunto subscribe my name this 29th day of June, 1923.

ARTHUR H. WOODWARD.